No. 668,337.   
O. NEWHOUSE.  
LUBRICATOR.  
(Application filed May 8, 1900.)  
(No Model.)  
Patented Feb. 19, 1901.
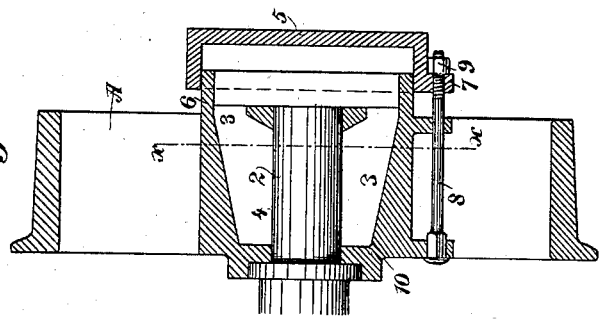
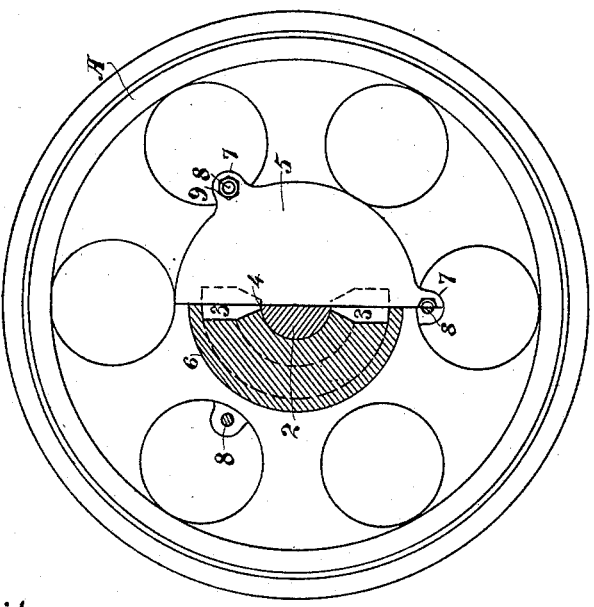
Witnesses,
Inventor,
Oscar Newhouse
By Dewey Strong & Co.
Atty

United States Patent Office.

OSCAR NEWHOUSE, OF SAN FRANCISCO, CALIFORNIA.

LUBRICATOR.

SPECIFICATION forming part of Letters Patent No. 668,337, dated February 19, 1901.

Application filed May 8, 1900. Serial No. 15,895. (No model.)

*To all whom it may concern:*

Be it known that I, OSCAR NEWHOUSE, a citizen of the United States, residing in the city and county of San Francisco, in the State of California, have invented an Improvement in Lubricators; and I hereby declare the following to be a full, clear, and exact description of the same.

My invention relates to an apparatus which is designed for use in lubricating axles and shafts of various descriptions, and is particularly designed for the lubrication of such bearings with what are known as "grease," "graphite," or other compounds which are not sufficiently liquid to flow.

It consists of the parts and the construction and combination of parts hereinafter described and claimed.

Referring to the accompanying drawings, Figure 1 is a face view of the wheel shown on half of the hub in section on line $x$ $x$ of Fig. 2. Fig. 2 is a longitudinal section of the same.

My invention is designed to apply heavy non-flowing lubricants to shafts or journal-bearings of any description by means of a direct-pressure mechanism.

As shown in Fig. 1, A represents a wheel turnable upon a shaft or axle 2. Within the hub of this wheel are formed chambers 3, adapted to contain the lubricant. These chambers may be of any suitable size or shape. I have here illustrated them as of rectangular form in cross-section and tapering from their inner sides toward the axle, where a narrow slit or channel is formed, as at 4, to allow the lubricant to be forced through and into contact with the axle. In order to thus apply the lubricant, I have shown a cap or plate 5, which in Fig. 1 is shown as fitted to a projecting circular flange 6. It is here shown as provided with lugs 7, through which bolts 8 pass, and the opposite ends of these bolts are secured upon the opposite side of the wheel-hub. Nuts 9, fitting upon the ends of the bolts, may be turned so as to advance the cap 5 whenever it is desired to apply fresh lubricant to the running parts.

10 is a small opening made from one of the containing boxes or chambers 3 to the exterior for the purpose of allowing any air contained in the box to be expelled when the lubricant is being introduced or at other times.

Having thus described my invention, what I claim as new, and desire to secure by Letters Patent, is—

1. The combination with a stationary and movable part of a bearing said bearing having a chamber adapted to contain a lubricant, of a closed cap slidably fitted over the outer end of the bearing, and means engaging the cap exterior to the chamber for advancing the cap to force the lubricant out of said chamber.

2. The combination, with a shaft and an inclosing box, said box having one or more chambers adapted to contain a non-flowing lubricant, and said chambers having contracted outlets leading to the wearing contact-surfaces, a cap slidably fitting over the end of the chamber and provided with lugs, and adjusting bolts and nuts between the flanges and box whereby the cap is advanced to force the lubricant into contact with the wearing-surfaces.

In witness whereof I have hereunto set my hand.

OSCAR NEWHOUSE.

Witnesses:
N. B. LIVERMORE,
WALTER H. HENRY.